T. L. BRIGGS.
APPARATUS FOR PURIFYING GASES AND FOR PRODUCING BRIQUETING MATERIAL.
APPLICATION FILED MAY 15, 1917.
1,301,373.
Patented Apr. 22, 1919.
2 SHEETS—SHEET 2.
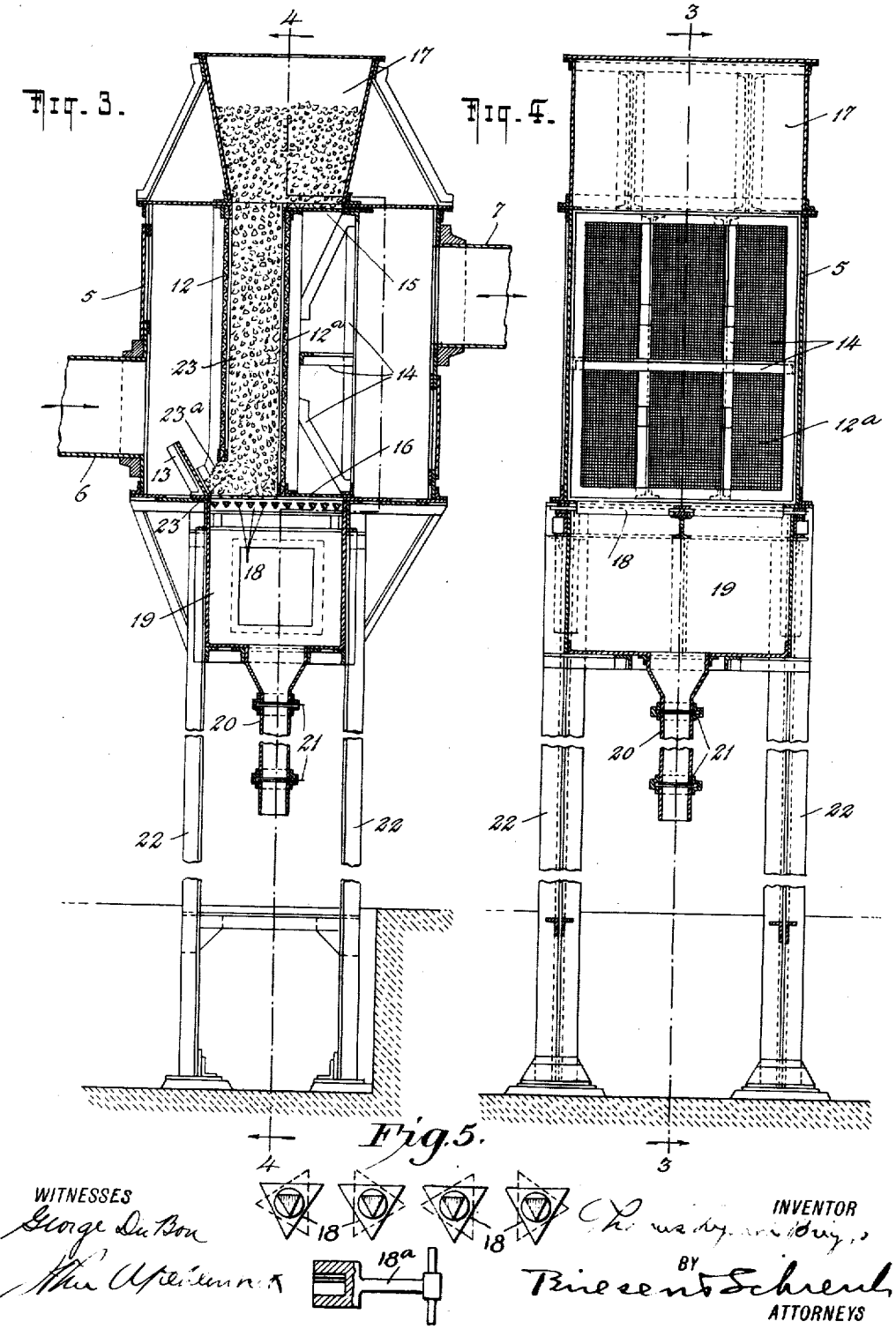

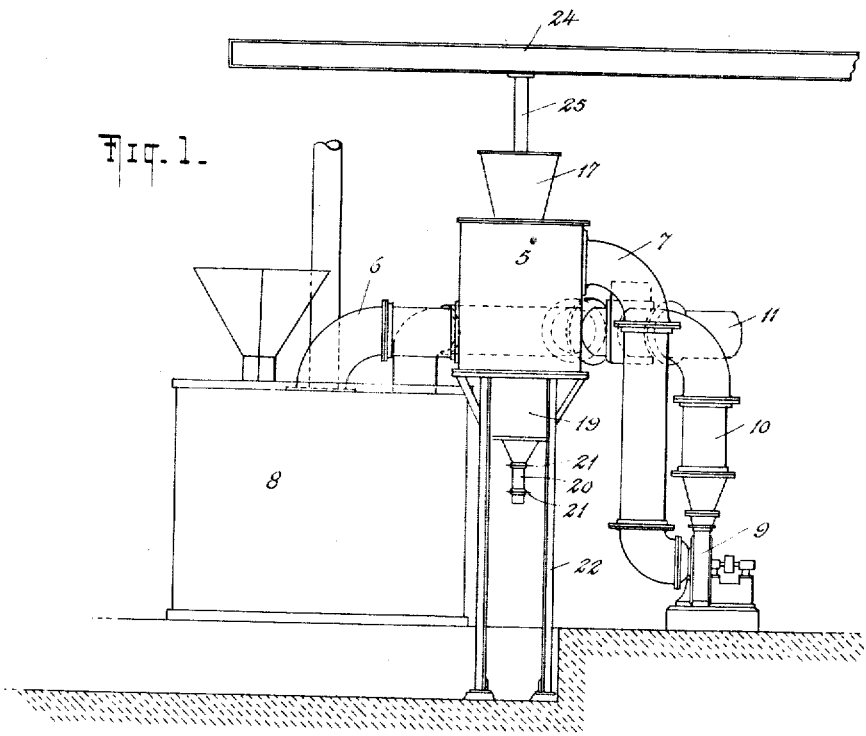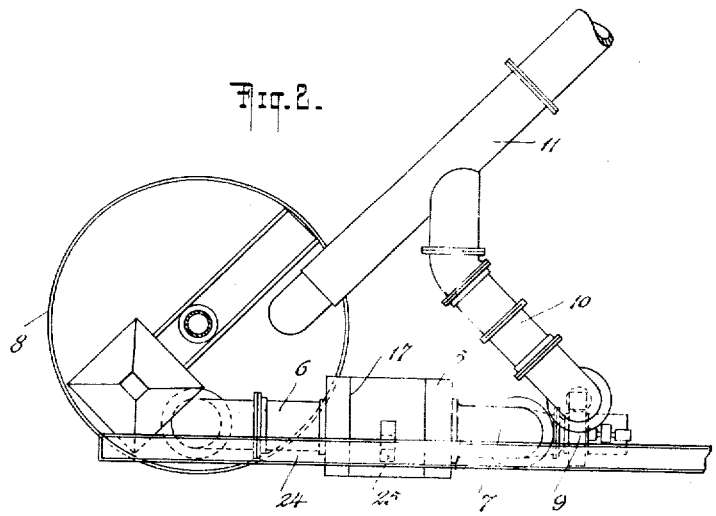

UNITED STATES PATENT OFFICE.

THOMAS LYNTON BRIGGS, OF FLUSHING, NEW YORK, ASSIGNOR TO GENERAL CHEMICAL COMPANY, OF NEW YORK, N. Y., A CORPORATION OF NEW YORK.

APPARATUS FOR PURIFYING GASES AND FOR PRODUCING BRIQUETING MATERIAL.

1,301,373. Specification of Letters Patent. Patented Apr. 22, 1919.

Original application filed June 1, 1916, Serial No. 101,170. Divided and this application filed May 15, 1917. Serial No. 168,705.

*To all whom it may concern:*

Be it known that I, THOMAS LYNTON BRIGGS, a subject of the King of Great Britain, and resident of Flushing, county of Queens, city and State of New York, have invented a certain new and useful Improvement in Apparatus for Purifying Gases and for Producing Briqueting Material, of which the following is a specification, My invention relates more particularly to the treatment of burner gases, such as for instance emanate from a Fines burner of the Herreshoff type as exemplified in United States patent to John B. F. Herreshoff, No. 556,750, of March 24, 1896. These gases consist of the well known mixture of sulfur dioxid, oxygen, and nitrogen, with small varying proportions of sulfur trioxid and dust consisting principally of iron oxid. The primary object of my invention is to remove dust contained in such gases by passing them through a vertically arranged and movable layer or bed of granular material preferably consisting of the cinder from burners of the type mentioned. The filtered gases consist of sulfur dioxid, oxygen and nitrogen and small varying proportions of sulfur trioxid and only a very small fraction of the total dust originally present. These gases are intended for use either in sulfuric acid manufacture or in the manufacture of sulfites or bisulfites in any of the old and well known ways. My improvement further contemplates the conversion of the granular filtering material, which previously is unfit for briqueting purposes, into a material specially adapted for the making of briquets, for example by the Gröndahl - Kjellin method, as exemplified in United States patent to Gustaf Gröndal, No. 780,337 of January 17, 1905; these briquets may be used for the production of iron in a blast furnace. A further object of my invention is to provide a simple apparatus whereby the above process may be efficiently carried out and whereby the above mentioned results are attained in an effective manner. Other objects of my improvement will appear from the description hereinafter and the features of novelty will be pointed out in the appended claims. This application is a division of another application filed by me in the United States Patent Office on June 1, 1916, Serial No. 101,170.

In the accompanying drawings I have illustrated by way of example, one form of my improved apparatus which has been successfully and practically utilized. In said drawings Figure 1 is an elevation of a plant including my improved apparatus; Fig. 2 is a plan view thereof; Fig. 3 is a vertical section on the line 3—3 of Fig. 4; Fig. 4 is a similar view on the line 4—4 of Fig. 3, and Fig. 5 is a detail diagrammatic view on an enlarged scale illustrating the grate bars and one means whereby said bars are actuated.

In carrying out my improved process the gases are conducted from the furnace and passed, under a suitable pressure, transversely through a vertical layer of granular material which layer is caused to move gradually downward either practically continuously or intermittently at more or less frequent intervals. After having passed through the layer of granular material the purified gases are suitably conducted away from the place at which the purification takes place. In passing through the said layer of granular material the dust or other impurities which it is desired to remove are retained by said material so that said gases are in the desired purified condition before being conducted away.

At the same time, as said gases pass through the cinder from a Fines burner, which as before stated is preferred for use as the granular filtering medium, the said cinder which previously is unfit for briqueting purposes, is converted into a material from which briquets may be readily and efficiently made. My improved process may of course be carried out with the aid of any suitable apparatus, the illustrated example having given practical and efficient results.

As shown in the illustrated example the apparatus comprises a preferably rectangular chamber 5 constructed for instance of sheet iron and having an inlet pipe 6 at one side preferably near the bottom and an outlet pipe 7 at the opposite side preferably located near the top of the chamber 5. In the example shown the inlet pipe 6 leads to the top of a furnace 8 which as before stated may be a Fines burner of the Herreshoff type, while the outlet pipe 7 is connected with a fan blower 9, the later communicating by means of a pipe 10 with a flue 11. A stationary screen 12 extends across the interior of the chamber 5 preferably in a direction transversely to the axes of the inlet and outlet pipes and at a distance from the inlet pipe 6 as shown in Fig. 3. This screen is suitably secured in position and preferably terminates at a distance from the bottom of the chamber 5, the illustrated example showing a stationary plate 13 secured to said bottom and inclining toward the space between the screen 12 and said bottom, the upper edge of said plate 13 being preferably higher than the lower edge of said screen 12. A second screen 12ª also extends across the interior of said chamber and preferably parallel to the first screen and is carried by a frame 14 adjustably mounted in said chamber in such a manner that the screen 12ª may be moved toward and away from the screen 12 when desired. The upper and lower portions of the frame 14 are provided respectively with plates 15 and 16 the purpose of which will appear more fully hereinafter. The screens 12 and 12ª may be of any mesh suitable for the intended purpose and may be constructed of any suitable material, screens of one quarter inch mesh of strong iron wire having been found efficient in the operation of my improved process and apparatus for the purification of burner gases employed in the manufacture of sulfuric acid by the contact process. At its upper end, the chamber 5 is provided with a preferably covered supply hopper 17 which communicates with the space between the two screens 12 and 12ª while a plurality of preferably triangular grate bars 18 are provided at the bottom of said chamber in registry with the space between said screens. It will be understood that the width of the lower end of the hopper 17 preferably corresponds to the distance between said screens 12 and 12ª when at their maximum adjustment away from each other, the grate bars 18 similarly occupying a space corresponding approximately to this distance. A receptacle 19 is located beneath the grate bars 18 and is provided with an outlet chute 20 controlled by a valve or valves 21, the chamber 5, receptacle 19 and coöperating parts being all supported in any suitable manner as by means of a supporting structure 22. The space between the screens 12 and 12ª is filled with a granular material 23 which passes from the supply hopper 17 and rests upon the grate bars 18, said material forming a talus-lute 23ª between the lower edge of the screen 12 and the plate 13 as shown in Fig. 3. The granular material 23 which forms a vertical filtering layer, as before stated, preferably comprises the cinder from a Fines burner and is preferably of such a size that it will pass through a one inch mesh sieve but will be retained by a one-quarter inch mesh sieve.

Said material 23 may be introduced into the hopper 17 in any suitable manner as for instance by being fed thereto by means of a conveyer 24 from which a chute 25 leads to the interior of said hopper 17.

In operation the gases by the action of the blower 9 pass from the inlet pipe 6 into the interior of the chamber 5 and transversely through the screen 12, granular material 23, and screen 12ª and then pass out through the outlet pipe 7. The said gases are consequently drawn or otherwise passed transversely through a vertical wall or bed of granular material, such as the cinders above mentioned, so that the dust is efficiently removed from said gases in their passage from the burner to the flue or other point. The wall or bed of granular material 23 is moved downward between the screens 12 and 12ª either practically continuously or intermittently at predetermined intervals by rocking the grate bars 18. It will be understood that suitable means whereby a continuous or practically continuous movement of the bed of granular material is produced may be provided without departing from the spirit of my invention. The movement of the layer or bed of filtering material may be governed by the indications afforded by the differential pressure between the inlet and outlet pipes, any increase above the maximum pressure desired being removed by rocking the grate bars 18 sufficiently to clear the passage-ways for the gases and to remove the collected dust. The collected dust and used granular material are deposited in the receptacle 19 from which they may be removed through the chute 20, it being understood that the actuation of the grate bars 18 may be brought about manually for instance by means of the key 18ª shown in Fig. 5 or by means of any suitable mechanism. As the wall or layer of material 23 is caused to descend through an actuation of the grate bars 18 whereby used material is removed from the bottom of said layer of fresh material will be coincidentally added at the top thereof from the hopper 17 so that the layer 23 is replenished and the space between the screens 12 and 12ª is always maintained full. The hopper 17 is kept supplied for instance by means of the conveyer 24.

By adjusting the screen 12ª relatively to the screen 12, the thickness of the wall or layer of granular material 23 may be regulated to meet the requirements of each specific case, the plates 15 and 16 serving respectively as a bottom and a cover for those portions of the hopper 17 and grate bars 18 located behind said screen 12ª.

The granular material may also be varied to suit each instance while the temperature of the gases and their speed through the layer of such granular material may also be regulated as desired. As before stated, in an actual operation of the apparatus I have found that a cinder of such size that it will pass through a sieve having a one inch mesh but will be retained by a sieve having a one-quarter inch mesh and taken from a Fines burner has given satisfactory and efficient results. In purifying gases from such burner for use in the manufacture of sulfuric acid gas the thickness of the layer of granular material is preferably about eighteen inches, while the gases are passed therethrough at a temperature of approximately 900° F. and at a speed of from substantially fifteen to sixteen lineal feet per minute, a pressure of ⅛″ water being sufficient for this purpose. Under such conditions from 95 to 98% of the oxid of iron dust contained in the gases is removed therefrom. It will of course be understood that the above is only an example and that the figures given may vary, these depending on the purpose for which the process and apparatus are utilized and the manner in which they are operated. It will be readily understood that in place of cinder from a Fines burner of the Herreshoff type, I can use any equivalent cinder such as can be obtained by suitably crushing and screening cinder from, for example, a lump-ore burner.

When using cinder from a Fines burner as the filtering material, the gases in passing therethrough convert this material from one unfit for the production of briquets into a material having special characteristics adapting it for the making of briquets. In this manner the cinder after having fully served its purpose as a filtering medium may be formed into useful briquets instead of being discarded as waste material.

The temperature of the gas while undergoing purification as described should be neither too high nor too low and should preferably be somewhere between a minimum temperature slightly above that at which substances harmful to the material of which the apparatus is constructed begin to condense out and attack said apparatus and a maximum temperature just below that at which the gas produces material such as sulfuricanhydrid. The minimum temperature of the gas being treated may be from 680 to 750° F. within which range the gas will be purified without causing any abnormal, unusual or avoidable injury to the material of which the apparatus is constructed and the filtering material will show some improvement as a briqueting material. The maximum temperature of said gas may be approximately 900° F. at which dust is efficiently removed from the gas without bringing about any condensation harmful to the apparatus and with a maximum of improvement in the filtering material as a briqueting substance. At this latter temperature a minimum and practically negligible quantity of sulfuric anhydrid is produced in the exit gas. Whenever conditions warrant it I therefore prefer to maintain the gas, during the purification thereof, at approximately the temperature last indicated.

It will be apparent from the above that, according to the temperature selected for the gas, purification alone may be effected, or both purification of the gas and maximum improvement of the filtering material for briqueting purposes may be accomplished while at the same time any intermediate results as to the change in the characteristics of the filtering material may be produced by simply passing the gas therethrough at the temperature whereby the desired results will be obtained.

While my apparatus is specially adapted for purifying gases which are afterward converted into sulfuric acid, said apparatus is not limited to this use but may be advantageously and efficiently used in many other connections.

Various changes in the specific apparatus described may be made within the scope of the claims without departing from the spirit of my invention.

I claim:

1. An apparatus of the kind described comprising a chamber having an inlet and outlet, a pair of vertical screens spaced from each other and located in said chamber between said inlet and outlet, a layer of granular material in the space between said screens, said layer extending from the top to the bottom of said chamber, a series of grate bars in the bottom of said chamber in registry with the space between said screens whereby material may be removed from the bottom of said layer and a hopper at the top of said chamber communicating with the space between said screens whereby said layer may be coincidentally replenished at the top.

2. An apparatus of the kind described comprising a chamber having an inlet and outlet, a pair of vertical screens spaced from each other and located in said chamber between said inlet and outlet, a layer of granular material in the space between said screens, said layer extending from the top to the bottom of said chamber, means for vibrating said layer to remove material from the bottom thereof, means for coincidentally replenishing said layer at the top and a receptacle beneath said chamber adapted to receive the material removed from the bottom of said layer.

3. An apparatus of the kind described comprising a chamber having an inlet and an outlet, a stationary vertical screen in said chamber between said inlet and outlet, an adjustable vertical screen substantially parallel with said stationary screen, a movable frame carrying said adjustable screen whereby the latter may be moved toward and away from said stationary screen, a layer of granular material in the space between said screens and extending from the top to the bottom of said chamber, a series of grate bars in the bottom of said chamber whereby said layer of material may be shaken down, a hopper at the top of said chamber whereby said layer may be replenished at the top and plates carried by said frame and extending rearwardly of said adjustable screen, said plates being arranged respectively to close that portion of the hopper outlet and to cover those grate bars which lie in the rear of said adjustable screen as the latter is moved.

In testimony whereof I have hereunto set my hand.

THOMAS LYNTON BRIGGS.